United States Patent [19]

Müller et al.

[11] 4,375,366
[45] Mar. 1, 1983

[54] CENTRIFUGAL CHAMBER FILTER FOR SEPARATING SOLIDS FROM A GAS STREAM

[75] Inventors: Friedrich-E. Müller, Eisdorf; G. Wolfgang Oesterwind, Osterode; Jürgen Nothdurft, Clausthal-Zellerfeld, all of Fed. Rep. of Germany

[73] Assignee: Anton Piller GmbH & Co. KG, Fed. Rep. of Germany

[21] Appl. No.: 344,948

[22] Filed: Feb. 2, 1982

[30] Foreign Application Priority Data

Feb. 5, 1981 [DE] Fed. Rep. of Germany ....... 3103910

[51] Int. Cl.³ .............................................. B01D 45/12
[52] U.S. Cl. ........................................ 55/416; 55/346; 55/459 R; 209/144; 210/512.1
[58] Field of Search .......................... 210/512.1, 512.2; 209/144; 55/345–349, 461, 413–417, 459 R, 460

[56] References Cited

U.S. PATENT DOCUMENTS

| 461,801 | 10/1891 | Radkey | 55/349 |
| 2,936,043 | 5/1960 | Armstrong | 55/416 |
| 3,420,040 | 1/1969 | Neely et al. | 55/346 |
| 4,205,965 | 6/1980 | Bielefeldt | 55/414 |

FOREIGN PATENT DOCUMENTS

129429  8/1932  Austria .................... 55/414

Primary Examiner—Bernard Nozick
Attorney, Agent, or Firm—Gottlieb, Rackman & Reisman

[57] ABSTRACT

The invention concerns a centrifugal chamber filter for separating solids from a gas stream. The filter has a cylindrical centrifugal chamber and outlet pipes which extend towards each other from the ends of the chamber for conducting away the purified gas. In order to convert the rotational flow energy into pressure energy, a distributor with radial blading is mounted between the adjacent inlet ends of the outlet pipes within the chamber. The outlet pipes are advantageously each provided with a nozzle ring at its inlet end. The distributor and/or the nozzle ring are advantageously designed to be slidable onto the ends of the outlet pipes.

11 Claims, 6 Drawing Figures

FIG. 1
FIG. 2
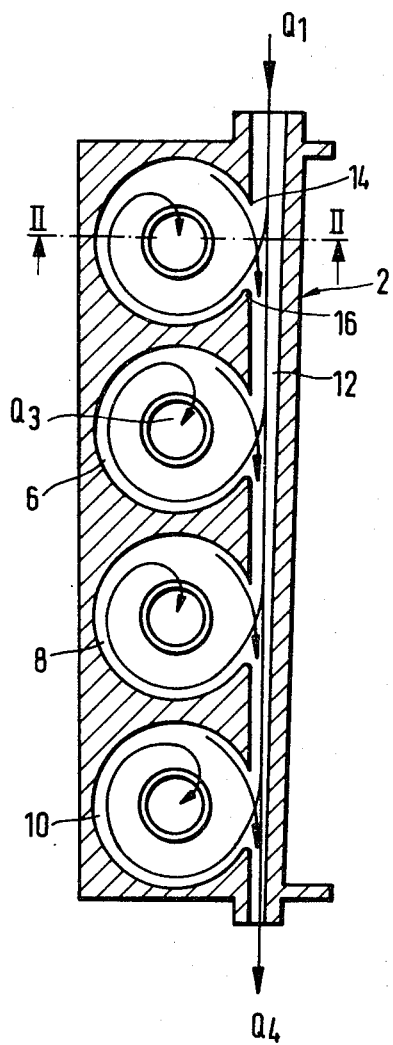
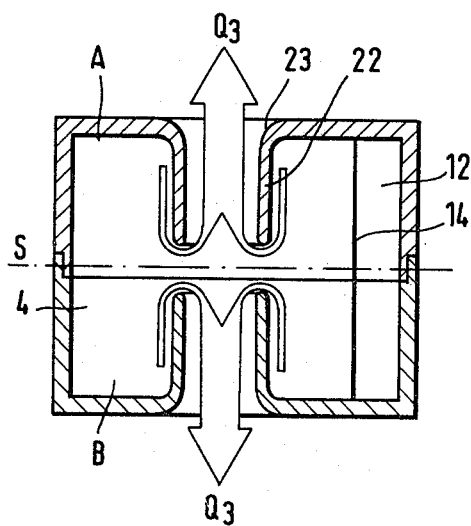

4,375,366

CENTRIFUGAL CHAMBER FILTER FOR SEPARATING SOLIDS FROM A GAS STREAM

BACKGROUND OF THE INVENTION

The invention concerns a filter for separating solids from a gas stream by means of centrifugal force, the filter having a cylindrical centrifugal chamber and outlet pipes which extend towards each other from the ends of the chamber for conducting away purified gas.

DESCRIPTION OF THE PRIOR ART

In the centrifugal chamber the gas to be purified acquires rotational energy. In many cases, for instance those with fairly large chamber diameters, it is desirable or necessary to convert the rotational energy of the purified gas stream into pressure energy and thereby to reduce the pressure drop within the filter. It is known to provide derotation chambers for this purpose, in the purified gas outlet duct outside the centrifugal chamber. Such derotation chambers are additional structural elements which moreover take up considerable space, the diameter of these chambers usually being greater than that of the centrifugal chamber itself. With centrifugal chambers connected in series, such external derotation chambers can make it necessary to increase the spacing between the individual centrifugal chambers correspondingly, whereby the constructional bulk of such a filter is again increased (De OS No. 2625422).

An object of the invention is to offer a possibility of performing conversion of the rotational energy into pressure energy without additional external constructional elements.

SUMMARY OF THE INVENTION

The problem posed is solved according to the invention in that a distributor having radial blading is mounted between the adjacent inlet ends of the outlet pipes within the chamber.

Advantageous forms of the distributor in accordance with the invention are described hereinafter and include the following features. The distributor may be provided at each end thereof with centring locating means which engage in adjacent ends of the outlet pipes. The centring locating means may be parts of the blading of the distributor which are reduced in diameter. Alternatively, the blading of the distributor may be mounted on an axial core. The core may be tapered from the central portion in the length of the distributor, where it has a diameter corresponding to the external diameter of the blading in the region between the adjacent ends of the outlet pipes, towards the two axial ends of the distributor which engage in the outlet pipe ends. The outlet pipes may each have a nozzle ring at its inlet end. Each nozzle ring may be so designed that it can slidably receive the respective outlet pipe end. Vanes of the blading may be carried by at least one of the nozzle rings. They may be fixed on at least one of the nozzle rings or part of the vanes may be mounted on each of the two nozzle rings. In yet another arrangement the blading may be arranged on both sides of a carrier disc mounted centrally between the adjacent ends of the outlet pipes.

BRIEF DESCRIPTION OF THE DRAWINGS

The invention is illustrated by way of examples in the drawings and is described in detail with the aid of the drawings, in which:

FIG. 1 is a longitudinal section through a four-stage filter element;

FIG. 2 is a cross-section along the line II—II in FIG. 1, and

DESCRIPTION OF THE PREFERRED EMBODIMENTS

Figure 3:
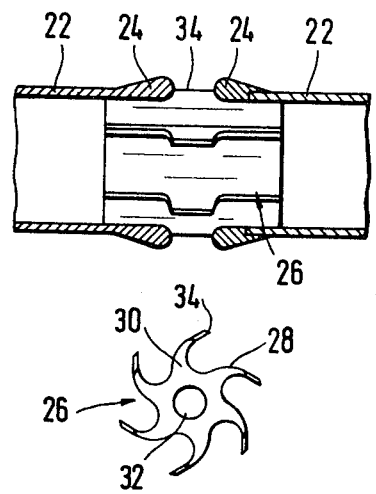
FIGS. 3 to 6 each show a different embodiment in axial cross-section and end views of two outlet pipes and means for the "untwisting" of the pure gas flow.

In FIG. 1 a filter element 2 constructed in four stages is shown in longitudinal section. The filter element has a flow channel 12 to which the four centrifugal chambers 4, 6, 8 and 10 are connected, each with a sharp trailing edge 14 and a blunt leading edge 16. The cross-section of the flow channel 12 is stepped down from chamber to chamber, between the inlet 18 and the outlet 20, in such a way that an equal flow velocity is achieved for all of the chambers. The volume $Q_1$ of the gas to be purified is reduced by the volume $Q_3$ of the purified gas flow which issues through the outlet pipes 22 which extend towards one another from the end walls of the generally cylindrical chamber to the centre thereof. The volume of flow, reduced by the volume $Q_3$ of the purified gas flow, enters the next following chamber and is again decreased by the volume $Q_3$ of the purified gas issuing from the outlet pipes. The residual flow volume $Q_4$, containing separated solids, emerges at the outlet 20. The inlet and outlet cross-sections of the chambers 4, 6, 8, 10 are designed so that the same flow velocities apply everywhere. The mode of operation of centrifugal chamber with outlet pipes, to separate suspended solids from a gas stream by centrifugal force, is known as such (DE OS No. 2160415) and need not be further described here.

The filter element which has been described hereinbefore in principle is only one constructional example. Filter elements with only one centrifugal chamber may be provided. The number of centrifugal chambers is dependent on the prevailing requirements. Further the centrifugal chambers may, as shown in the drawing, be disposed in a single housing, as is beneficial especially with chambers of smaller diameter, or can be designed as separate chambers which are built on to one another in series according to requirements.

As conditioned by the manufacture, the centrifugal chambers are in each case divided transversely to the axial direction. Such a division can be effected for instance adjacent an end wall, or symmetrically as shown in FIG. 2. Here the centrifugal chamber 4 is constructed to be divided on its line of symmetry S. The centrifugal chambers or filter elements containing them can be produced in this way in the form of two parts A, B which are mirror images one with the other and do not have undercuts and therefore can be cast in simple two-part moulds. The two parts A and B can, for instance, be produced from synthetic resin by injection moulding or from metal by die casting. With such a realization, the outlet pipes 22 can be cast on end walls. Further, the outlet pipes 22 can be provided in a simple manner with a nozzle-shaped outlet 23.

As can be seen from FIG. 2, the outlet pipes 22, directed towards one another, are situated with their ends spaced a distance apart. The purified gas enters the outlet pipes 22 in the intermediate space between their adjacent ends. For conversion of the rotational energy of the purified gas stream into pressure energy and thereby to reduce the pressure drops, radial distributors are disposed between the adjacent outlet pipe ends, as shown in FIGS. 3 to 6 in different embodiments and as described as follows.

In the embodiment shown in FIG. 3, nozzle rings are mounted on or are formed on the end of the outlet pipes 22. With outlet pipes that are made separately and are afterwards joined to the centrifugal chamber, such nozzle rings can, as shown in FIG. 3 on the left-hand outlet pipe 22, be integral with the outlet pipe. With filter elements for which the centrifugal chambers are cast integrally in two halves, such a nozzle ring would form an undercut. With such an embodiment, the nozzle ring is therefore made separately and slipped on. The nozzle rings 24 can be made with high precision by injection moulding or die casting and can for instance be joined to the outlet pipes by cementing, as shown on the right-hand outlet pipe 22.

Between the two outlet pipe ends formed by the nozzle rings, a distributor 26 is installed which is symmetrical with the outlet pipe ends and extends to a limited extent into the outlet pipe ends. As can be seen from the end view of the distributor shown in the lower part of FIG. 3, the distributor has curved guide vanes 28 spaced apart around its periphery. The vanes extend from a core 30 which at its centre is provided with a longitudinal throughway 32. A blank for such a distributor can be produced by continuous casting or by extrusion. The external diameter of the guide vanes 28 is so chosen that the axial width of the outer edge 34 of the guide vanes (as shown in the upper part of FIG. 3) approximates to the least distance apart of the two nozzle rings 24. Adjoining this section, the guide vanes 28 are externally reduced, e.g., they may be turned over according to internal contour of the nozzle rings 28 and the outlet pipes 22, so that they can be inserted generally without a gap with the vanes 28 fitting into the outlet pipe ends. The vane curvature is directed oppositely to the direction of swirl of the purified gas flow. The reaction pressure may, for example, be absorbed by inserting the distributor 26 into at least one of the outlet pipes 22 with a press fit. On assembly, the distributor 26 is inserted into one of the outlet pipes 22. When the chamber is closed by the second chamber part, the end of the other outlet pipe 22 is guided over the adjacent end of the distributor 26.

Figure 4:
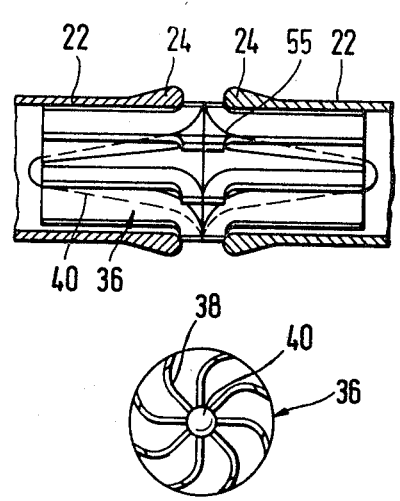

In the embodiment shown in FIG. 4, nozzle rings 26 are disposed on the ends of the outlet pipes 22 and these can be slipped on. The distributor 36 has guide vanes 38 which engage in a similar way in the intermediate space between the nozzle rings and moreover are offset or bent over according to the internal diameter of the outlet pipes. In the embodiment shown in FIG. 4, from the intermediate space between the nozzle rings there originate conical guides 40 which pass through the guide vanes and taper in the direction of flow in the outlet pipes. At their feet which touch one another, the guides 40 are provided with entrance curves 55. In the end view shown in the lower portion of FIG. 4, the rounded point of such a guide cone 40 is seen. Distributors 36 as shown in FIG. 4 may be produced by injection moulding.

Figure 5:
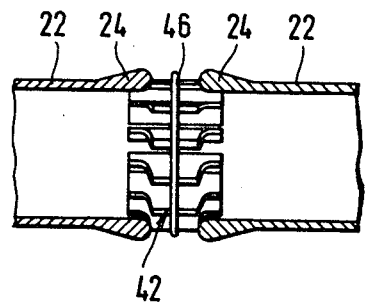

In the embodiment shown in FIG. 5, a distributor 42 is provided having guide vanes 44, which in the region of the nozzle rings 24 extend into the narrowest cross-section and moreover are matched to the internal contour of the adjacent outlet pipe ends. The blading 44 is arranged on a disc 46 which lies centrally in the intermediate space between the nozzle rings and extends beyond the outer periphery of the blading. The disc 46 may be provided with an opening 48 at its centre. A distributor of this kind may be produced by injection moulding or by die casting.

Figure 6:
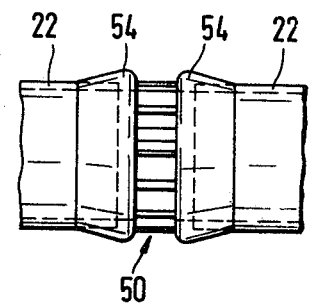

In the embodiment as shown in FIG. 6, a distributor 50 is provided having guide vanes 52 which are fixed on one of the nozzle rings 54 which may be mounted on the adjacent outlet pipe ends. In a preferred embodiment, the guide vanes 52 are fixed alternately on one of the two nozzle rings 54, so that the two nozzle rings 54 together with their vanes 52 produce the overall blading. Nozzle rings of this kind may be made by injection moulding or by die casting. In this embodiment, the guide vanes 52 can be fixed only on the front ends of the nozzle rings 54. They may however, in other embodiments, extend to a limited extent into the nozzle ring itself or even into the outlet pipe 22.

The depth of insertion of the distributor blading into the outlet pipe ends can be chosen according to the prevailing requirements.

By means of the distributors provided in accordance with the invention, the rotational energy of the purified gas flow entering into the outlet pipes is converted into pressure energy and thereby the pressure drop in the filter is reduced. This conversion is made possible without additional structural bulk and can therefore be realized with economy of space. In addition the production of the distributors is relatively low.

What I claim and desire to secure by Letters Patent of the United States is:

1. A filter having a cylindrical centrifugal chamber into which gas from which solids are to be separated is introduced with a centrifugal motion and outlet pipes for leading away purified gas, the outlet pipes extending inwardly of the chamber and facing towards each other from the chamber ends, said outlet pipes having inlets at their adjacent ends, said filter also including a distributor having circumferentially-spaced radial blading and mounted between said adjacent inlet ends of said outlet pipes within said chamber.

2. A filter as claimed in claim 1 in which said blading is arranged on both sides of a carrier disc mounted centrally between said adjacent ends of said outlet pipes.

3. A filter as claimed in claim 1, in which said distributor has at each end thereof centring locating means which engage in said adjacent ends of said outlet pipes.

4. A filter as claimed in claim 3, in which said centring locating means are parts of the blading of said distributor which are reduced in diameter.

5. A filter as claimed in claim 1, in which said distributor has an axial core on which said blading is mounted.

6. A filter as claimed in claim 5, in which said core is tapered from a central portion thereof in the length of the distributor, where it has a diameter corresponding to the external diameter of the blading in the region between said adjacent ends of said outlet pipes, towards the two axial ends of said distributor which engage in said outlet pipes.

7. A filter as claimed in claim 1, in which each said outlet pipe has a nozzle ring at its inlet end.

8. A filter as claimed in claim 7, in which vanes of said blading are fixed on at least one of said nozzle rings.

9. A filter as claimed in claim 7 in which each said nozzle ring slidably receives the respective outlet pipe end.

10. A filter as claimed in claim 9, in which vanes of said blading are carried by at least one of said nozzle rings.

11. A filter as claimed in claim 9, in which a part of vanes of the blading is mounted on each of said two opposed nozzle rings.

* * * * *